United States Patent [19]
Spring et al.

[11] Patent Number: 5,464,980
[45] Date of Patent: Nov. 7, 1995

[54] FLAME SENSORS AND METHODS OF SENSING FLAME

[75] Inventors: David J. Spring, Slough, United Kingdom; John D. King, St. Paul, Minn.

[73] Assignees: Kidde-Graviner Limited; Detector Electronics (UK) Limited, Derby, England

[21] Appl. No.: 193,125

[22] PCT Filed: Aug. 13, 1992

[86] PCT No.: PCT/GB92/01497

§ 371 Date: Feb. 14, 1994

§ 102(e) Date: Feb. 14, 1994

[87] PCT Pub. No.: WO93/04346

PCT Pub. Date: Mar. 4, 1993

[30] Foreign Application Priority Data

Aug. 23, 1991 [GB] United Kingdom ............... 9118202

[51] Int. Cl.⁶ ........................................ G01J 5/38

[52] U.S. Cl. ............... 250/338.1; 250/339.15; 250/342; 250/344; 250/345

[58] Field of Search ............... 250/339.15, 342, 250/345, 344, 338.1

[56] References Cited

U.S. PATENT DOCUMENTS

| | | | |
|---|---|---|---|
| 2,989,638 | 6/1961 | Laudon et al. | 250/338.1 |
| 3,566,106 | 2/1971 | Fletcher | 250/338.1 |
| 4,163,382 | 8/1979 | Amer | 73/24.02 |

FOREIGN PATENT DOCUMENTS

| | | |
|---|---|---|
| 1094499A | 12/1967 | United Kingdom . |
| 2020025A | 11/1979 | United Kingdom . |

*Primary Examiner*—Constantine Hannaher
*Attorney, Agent, or Firm*—Leydig, Voit & Mayer, Ltd.

[57] ABSTRACT

A flame sensor comprises a cell (10) containing an infra-red absorptive fluid such as carbon dioxide gas. Heating caused by absorption of the infra-red radiation is detected by measuring a resulting temperature or pressure change.

25 Claims, 2 Drawing Sheets

5,464,980

FLAME SENSORS AND METHODS OF SENSING FLAME

The invention relates to flame sensors and methods of sensing flame.

According to one aspect of the invention, there is provided a flame sensor comprising a cell having a window transmissive of radiation emitted by a flame and containing gas absorptive of selected radiation in the emission spectrum of the flame, and detection means responsive to heating of the gas caused by absorption of the selected radiation, wherein the gas comprises a mixture containing at least one isotope of carbon dioxide selected from $^{13}C^{16}O_2$ and $^{13}C^{18}O_2$.

In a preferred embodiment of the invention the mixture may also contain carbon dioxide $^{12}C^{16}O_2$ and or nitrous oxide.

The detection means may detect directly a change of temperature of the fluid caused by said heating and may, for example, comprise a sensitive thermocouple or thermopile.

Alternatively, the detection means may detect a change of pressure of the fluid caused by said heating and may comprise a pressure-sensitive displacement transducer such as a capacitive condenser microphone.

According to a further aspect of the invention there is provided a flame sensor comprising a cell having a window transmissive of radiation emitted by a flame and containing a fluid absorptive of selected radiation in the emission spectrum of the flame, and detection means responsive to heating of the fluid caused by absorption of the selected radiation, wherein the detection means comprises a flexible membrane having a light-reflective surface, an optical fibre for transmitting a light beam onto said light-reflective surface and means for detecting a change of intensity of the reflected light beam caused by displacement of the membrane.

Flame sensors and methods of sensing flame in accordance with the invention are now described, by way of example only, with reference to the accompanying drawings in which.

Figure 1:
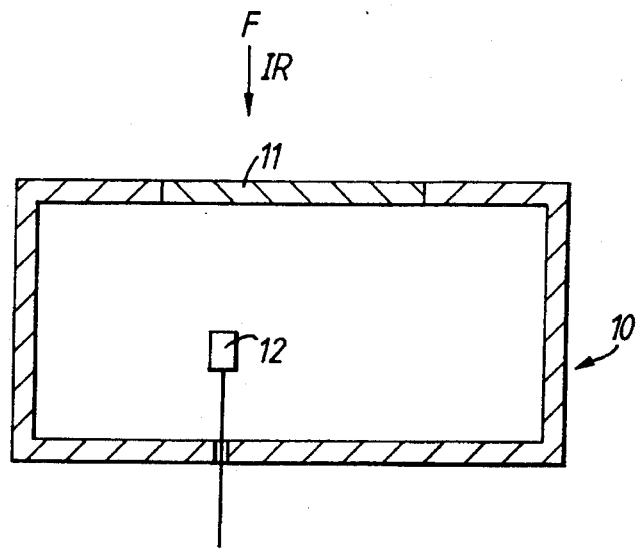
FIG. 1 shows one embodiment of a flame sensor according to the invention.

Referring to FIG. 1, the flame sensor comprises a cell 10 having a window 11, made from potassium bromide for example, through which radiation emitted by a flame F can enter the interior of the cell.

The cell contains a fluid (a gas, vapour or liquid) chosen to be absorptive of selected radiation in the emission spectrum of the flame, such absorption causing heating of the fluid which is detected to give an indication that a flame has been sensed.

In a preferred embodiment of the invention, the cell contains carbon dioxide gas (i.e. $^{12}C^{16}O_2$). As will be explained, this choice of gas renders the flame sensor responsive to hydrocarbon flames and flames of other carbon-containing fuels.

Figure 2:
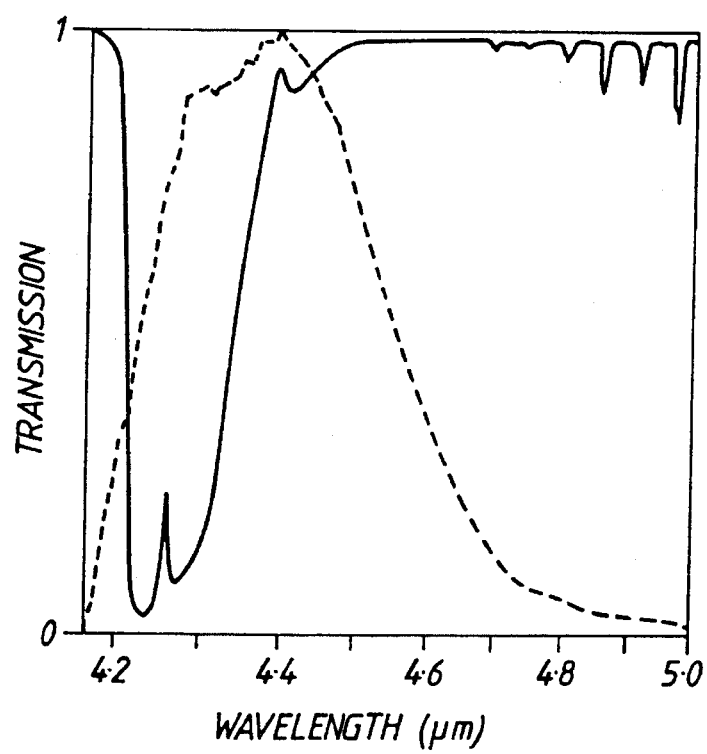
FIG. 2 shows the emission spectrum of a hydrocarbon flame and the transmissivity of infra-red radiation from the flame through four meters of air.

The broken curve shown in FIG. 2 represents part of the emission spectrum of a hydrocarbon flame. The flame is strongly emissive of infra-red radiation in the wavelength range from 4.17 µm to 4.76 µm, almost all the radiation emitted in this range being due to the presence of excited carbon dioxide molecules in the hot gases of the flame. An emission spectrum measured at higher resolution would reveal that the broken curve shown in FIG. 2 is, in fact, the envelope of a large number of narrow emission lines resulting from transitions between different vibrational energy states of the excited carbon dioxide molecules.

By contrast, the temperature of the carbon dioxide gas contained in cell 10 of the flame sensor is at or close to ambient temperature giving a relatively narrow absorption spectrum centred on 4.26 µm.

Carbon dioxide molecules are also present in the atmosphere at a concentration of about 350 ppm. Atmospheric carbon dioxide has the beneficial effect that it completely absorbs and blocks infra-red radiation from the sun in the wavelength range from about 4.2 µm to 4.4 µm (the so-called "solar blind" effect) and so eliminates a potential source of interference. However, carbon dioxide in the atmosphere also absorbs a significant portion of the infra-red radiation emitted by a hydrocarbon flame and so reduces the level of detectable radiation reaching the flame sensor. The solid curve shown in FIG. 2 illustrates, by way of example, how the transmission of infra-red radiation in the wavelength range from 4.2 µm to about 4.5 µm is modified by the absorption that occurs in 4 meters of air. Because of the absorption by atmospheric carbon dioxide, the flame sensor is mainly intended for use at short range, and is particularly useful in the range up to 15 meters.

With a view to extending the range of the flame sensor, the cell 10 may contain a substantial amount of one or more of the higher isotopes of carbon dioxide such as $^{13}C^{16}O_2$ and $^{13}C^{18}O_2$. The isotopes of carbon dioxide are absorptive of infra-red radiation at comparatively longer wavelengths for which absorption by atmospheric carbon dioxide is less significant. The isotopes $^{13}C^{16}O_2$ and $^{13}C^{18}O_2$ have absorption spectra centred on 4.38 µm and 4.49 µm respectively.

It will be understood that gases other than the isotopes of carbon dioxide could be used to achieve a similar effect. Other gases that could be used include nitrous oxide ($N_2O$), having an absorption spectrum centred at 4.50 µm, carbon monoxide (CO), having an absorption spectrum centred at 4.67 µm and a variety of deuterated hydrocarbons such as $CD_4$ and $C_2D_6$ which have absorption spectra in the range from 4.5 µm to 4.7 µm.

It will be appreciated that in order to improve the efficiency of absorption of the emitted flame radiation a mixture of two or more different gases could be used. A gaseous mixture of $^{12}C^{16}O_2$, $^{13}C^{16}O_2$ and $N_2O$ is found to be particularly useful.

Hydrocarbon flames are also emissive of infra-red radiation in the wavelength range from 2.5 µm to 2.8 µm due to emissions from excited carbon dioxide molecules and excited water molecules present in the hot gases of the flame.

Carbon dioxide molecules and water molecules will both absorb infra-red radiation in this wavelength range and so the cell 10 of the flame sensor could contain carbon dioxide gas or water vapour or a mixture of the two.

Carbon dioxide and water molecules in the atmosphere absorb and block the sun's radiation in the wavelength range from 2.5 µm to 2.8 µm and so these molecules also have the effect of reducing the level of detectable radiation reaching the flame sensor.

A flame sensor containing carbon dioxide gas and/or water vapour could also be used to detect hydrogen flames—such flames contain excited water molecules and so they are emissive of infra-red radiation in the wavelength range from 2.5 μm to 2.8 μm.

It will be appreciated that the cell 10 of the flame sensor could contain other fluids chosen to be absorptive of selected radiation in the emission spectrum of a flame that is to be sensed and that liquids, such as liquid water, could be used instead of gases and/or vapours.

Heat generated by absorption of the selected radiation can be detected by a variety of different techniques.

In one embodiment, a temperature change (typically of the order of 0.01 to 1.0 Kelvin) caused by heating is detected using a sensitive thermocouple or other temperature measuring device (e.g. a thermopile), shown generally at 12 in FIG. 1.

Alternatively, a temperature change caused by heating of the fluid could be detected using an optical temperature-detection technique by detecting the effect of such heating on optical radiation transmitted to the cell 10 along an optical fibre or similar optical transmission means. An optical temperature-detection technique obviates the need to provide an electrical power supply and/or associated electrical circuitry in the vicinity of the flame and is therefore particularly advantageous for use in hazardous environments.

Figure 5:
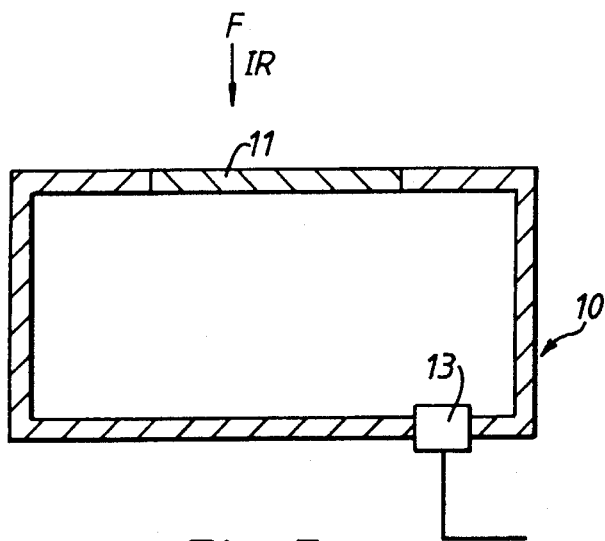
FIG. 5 shows a yet further embodiment of the invention.

In a yet further embodiment of the invention, shown in FIG. 5, heat generated by absorption of the selected radiation could be detected by sensing a corresponding change of pressure in cell 10, and such pressure changes (typically of the order of $10^{-5}$ to $10^{-3}$ bar) can be detected using a sensitive displacement transducer, such as a capacitive condenser microphone, shown generally at 13.

A capacitive condenser microphone has a flexible membrane which is exposed to the pressure of fluid in the cell 10 and any displacement of the membrane caused by a change of fluid pressure in the cell is detected capacitively.

A displacement transducer of this kind has the drawback that it needs an electrical power supply. Therefore, it is preferable to detect displacement of a membrane by optical means.

Figure 3:
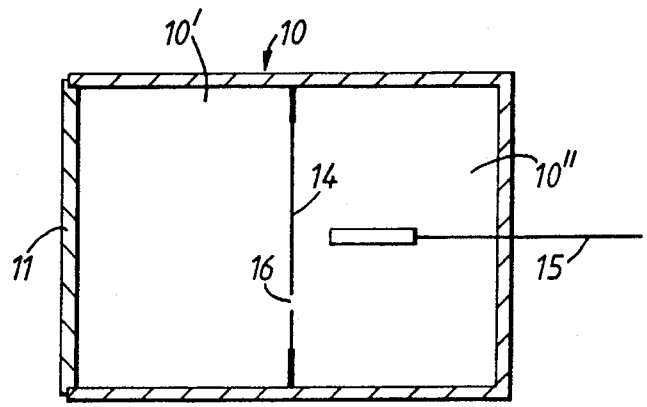
FIG. 3 shows another embodiment of a flame sensor according to the invention.

In the embodiment shown in FIG. 3, a membrane 14 has a light-reflective surface which is exposed to laser light transmitted thereto along an optical fibre 15, or similar optical transmission means. The laser light is focussed onto the membrane, and any displacement thereof causes a variation of the reflected light intensity as the membrane moves into and out of focus. Accordingly, detection is by means of light intensity measurement.

Alternatively, displacement of the membrane could be detected interferometrically by causing reflected laser light to interfere with a reference beam and monitoring movement of interference fringes relative to a datum position, or by measuring s delay between transmitted and reflected beams.

The flame sensor shown in FIG. 3 is designed to compensate for ambient temperature and pressure changes. Membrane 14 separates the cell into two chambers; a first, "active" chamber 10' containing a fluid (e.g. a mixture of $N_2O$, $CO_2$ and $^{13}CO_2$) which undergoes heating due to absorption of radiation emitted by a flame being sensed, and a second, "compensating" chamber 10" containing a fluid, such as nitrogen gas ($N_2$), which is non-absorptive of the selected radiation. A change of ambient temperature and/or pressure would cause a pressure change in one of the chambers (to one side of the membrane) exactly balancing the pressure change in the other chamber (to the opposite side of the membrane) and in this way the sensor is made insensitive to said ambient temperature and/or pressure changes.

As well as providing the active and compensating chambers 10',10" with different fills, or as an alternative thereto, the compensating chamber 10" could be shielded from exposure to the radiation emitted by the flame.

By these means, the flame sensor is made sensitive to changes due to absorption of the selected radiation, and substantially insensitive to ambient changes which affect both chambers substantially equally and do not displace the membrane.

In the case of a shielded compensating chamber 10", both chambers 10',10" may contain the same gas or gas mixture. In such circumstances, it is beneficial to provide a small hole 16 in the membrane 14. The hole allows gas to flow between the two chambers thereby substantially eliminating any long term variations in ambient temperature, pressure and light level that might otherwise affect the chambers differently.

Instead of using an optical detector means, heating due to Absorption of the selected radiation could be detected by measuring the resulting temperature (or pressure) change directly.

Figure 4:
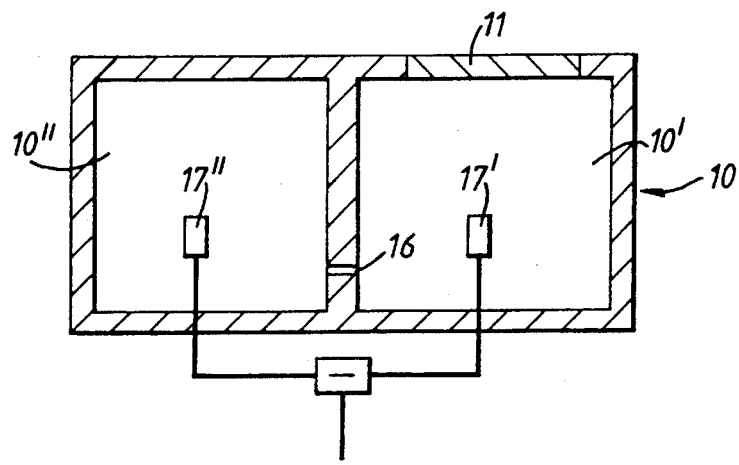
FIG. 4 shows a yet further embodiment of the flame sensor.

As shown in FIG. 4, each chamber 10',10" is fitted with a respective thermocouple 17",17" (or pressure sensitive displacement transducer) whose outputs are connected together differentially. With this arrangement, the flame sensor will be sensitive to a temperature (or pressure) change caused by heating of the fluid in the active chamber 10', due to absorption of the selected radiation, but will be insensitive to changes of ambient temperature (or pressure) which affect both chambers equally.

As before, the active and compensating chambers 10',10" in FIG. 4 may have the same or different fills, the compensating chamber 10" may be shielded from exposure to the radiation emitted by the flame, and a hole 16 may be provided in the wall separating the chambers.

It will be appreciated that the heating caused by the absorption of selected radiation emitted by a flame could be detected in other ways; for example, by sensing a flow of fluid between two separate chambers in the cell, the fluid in one of the chambers being exposed to radiation emitted by a flame and being subject to heating, and the fluid in the other chamber being shielded from the radiation. The flow of fluid between the two chambers could be detected by sensing the cooling effect of the flow on a heated filament.

A flame sensor as described has a variety of different applications. It could be used, for example to remotely sense the presence of flame in an industrial boiler, or as part of a fire detection system, having applications in the petrochemical industry or in the aerospace industry (for use in aircraft hangers, for example).

Furthermore, as already explained, a flame sensor employing optical means to detect heating caused by absorption of selected radiation has particular, though not exclusive, utility in hazardous environments.

Other applications of the flame sensor will be readily apparent to persons of ordinary skill in the art.

We claim:

1. A flame sensor comprising a cell having a window transmissive of radiation emitted by a flame and containing gas absorptive of selected radiation in the emission spectrum of the flame, and detection means responsive to direct heating of the gas due to absorption by the gas of the selected radiation, wherein said gas comprises a mixture of radiation-absorptive gas including at least one isotope of carbon dioxide selected from $^{13}C^{16}O_2$ and $^{13}C^{18}O_2$.

2. A flame sensor as claimed in claim 1, wherein the mixture also contains carbon dioxide ($^{12}C^{16}O_2$).

3. A flame sensor as claimed in claim 1 wherein, the mixture also contains nitrous oxide.

4. A flame sensor as claimed in claim 1, wherein the cell also contains one or more of the gases and vapour in the group consisting of carbon monoxide, deuterated hydrocarbons and water vapour.

5. A flame sensor as claimed in claim 1, wherein the detection means comprises optical means responsive to heating of the gas caused by absorption of the selected radiation.

6. A flame sensor as claimed in claim 1, wherein the detection means comprises a flexible membrane having a light-reflective surface, optical means for focussing a light beam on said light-reflective surface and for detecting a change of intensity of the reflected light beam caused by displacement of the membrane.

7. A flame sensor as claimed in claim 6, wherein the flexible membrane is located between a first chamber of the cell which is subjected to heating by absorption of the selected radiation and a second chamber which is not subjected to heating by absorption of the selected radiation.

8. A flame sensor as claimed in claim 7, wherein the first chamber contains gas which is absorptive of the selected radiation and the second chamber contains different gas which is non-absorptive of the selected radiation.

9. A flame sensor as claimed in claim 7, wherein the second chamber of the cell is masked from exposure to radiation emitted by a flame.

10. A flame sensor as claimed in claim 9, wherein the first and second chambers contain the same gas and the flexible membrane has a hole providing gas communication between the first and second chambers.

11. A flame sensor as claimed in claim 1, wherein the detection means detects a change of pressure of the gas caused by said heating.

12. A flame sensor as claimed in claim 11 wherein the detection means is a pressure-sensitive displacement transducer.

13. A flame sensor as claimed in claim 12, wherein the pressure-sensitive displacement transducer comprises a flexible membrane and means to detect displacement of the flexible membrane caused by a change of pressure of the gas.

14. A flame sensor as claimed in claim 13, wherein the pressure-sensitive displacement transducer comprises a flexible membrane having a light-reflective surface and optical means for detecting displacement of the membrane caused by a change of pressure of the gas.

15. A flame sensor as claimed in claim 14, wherein the optical means detects displacement of the membrane interletometrically.

16. A flame sensor as claimed in claim 14, wherein the optical means monitors the transit time of a light beam reflected at the light-reflective surface of the membrane.

17. A flame sensor as claimed in claim 12, wherein the pressure-sensitive displacement transducer is located between a first chamber of the cell containing gas which is subjected to heating by absorption of the selected radiation and a second chamber of the cell containing gas which is not subject to heating by absorption of the selected radiation, whereby to compensate for a change of ambient temperature.

18. A flame sensor as claimed in claim 17, wherein the first chamber of the cell contains a gas which is absorptive of the selected radiation and the second chamber of the cell contains a different gas which is non-absorptive of the selected radiation.

19. A flame sensor as claimed in claim 17, wherein the second chamber of the cell is masked from exposure to radiation emitted by a flame.

20. A flame sensor as claimed in claim 1, wherein the detection means detects directly a change of temperature of the gas caused by said heating.

21. A flame sensor as claimed in claim 20, wherein the cell comprises a first chamber containing gas which undergoes heating due to absorption of the selected radiation and a second chamber containing gas which does not undergo heating due to absorption of the selected radiation, and respective said detection means provided in each said chamber are connected together differentially whereby to compensate for a change of ambient temperature.

22. A flame sensor as claimed in claim 21, wherein the first chamber of the cell contains a gas which is absorptive of the selected radiation and the second chamber of the cell contains a different gas which is non-absorptive of the selected radiation.

23. A flame sensor as claimed in claim 21, wherein the second chamber of the cell is masked from exposure to radiation emitted by a flame.

24. A flame sensor as claimed in claim 1, wherein the detection means detects a flow of said gas between a first region of the cell in which the gas is subjected to said heating and a second region of the cell in which the gas is not subjected to said heating.

25. A flame sensor as claimed in claim 1, wherein the detection means is arranged to compensate for a change of ambient temperature.

\* \* \* \* \*